Oct. 7, 1958  C. R. LILIENTHAL ET AL  2,855,061
HAND-GUIDED TRANSPORTER WITH POWERED TANDEM WHEELS
Filed Dec. 9, 1954  3 Sheets-Sheet 1

Clarence R. Lilienthal
Carson D. Simpson
INVENTORS,

BY *Clarence A. O'Brien*
*and Harvey B. Jackson*
Attorneys

Oct. 7, 1958  C. R. LILIENTHAL ET AL  2,855,061
HAND-GUIDED TRANSPORTER WITH POWERED TANDEM WHEELS
Filed Dec. 9, 1954  3 Sheets-Sheet 2

Clarence R. Lilienthal
Carson D. Simpson
INVENTORS

Oct. 7, 1958   C. R. LILIENTHAL ET AL   2,855,061
HAND-GUIDED TRANSPORTER WITH POWERED TANDEM WHEELS
Filed Dec. 9, 1954   3 Sheets-Sheet 3
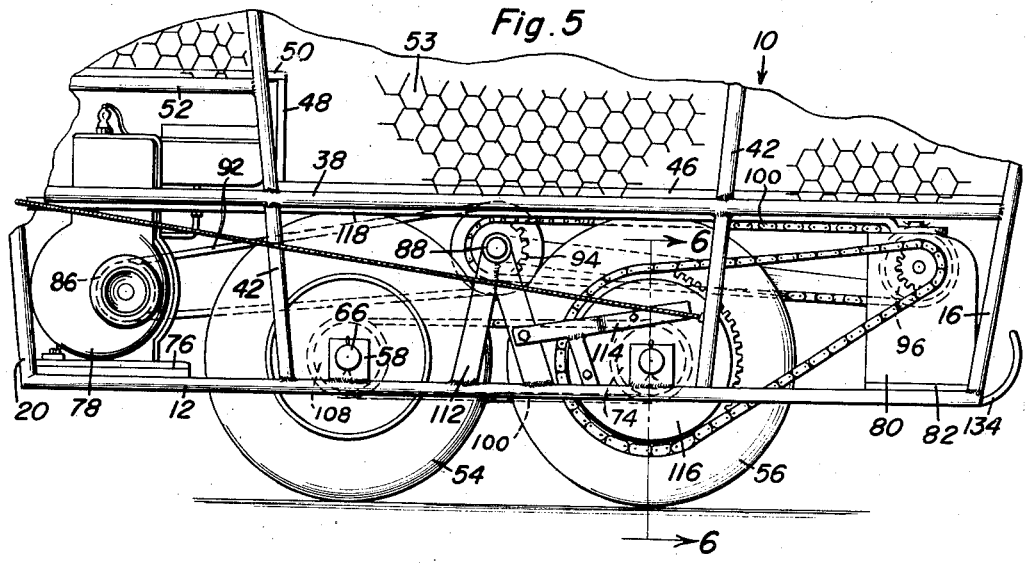
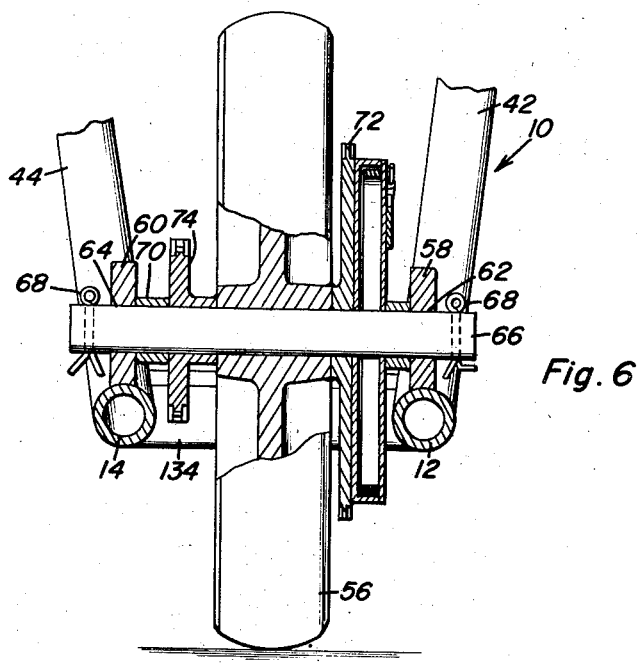
Clarence R. Lilienthal
Carson D. Simpson
INVENTORS,

United States Patent Office 2,855,061
Patented Oct. 7, 1958

2,855,061

HAND-GUIDED TRANSPORTER WITH POWERED TANDEM WHEELS

Clarence R. Lilienthal and Carson D. Simpson, Granger, Wash.

Application December 9, 1954, Serial No. 474,056

2 Claims. (Cl. 180—19)

This invention relates in general to new and useful improvements in wheeled vehicles, and more particularly to an improved self-propelled vehicle.

Up to the present time, the conventional manner in which equipment and supplies have been moved over mountainous trails and the like, has been primarily limited to packs carried by individuals and pack-horses and mules. However, it can be appreciated that a mechanized vehicle which would satisfactorily travel over such mountainous trails would greatly speed up operations, particularly in the case of fire fighters and the like.

It is therefore the primary object of this invention to provide an improved transporting machine which is entirely mechanized and which is so constructed whereby it will easily negotiate mountain trails and through rough areas.

Another object of this invention is to provide a wheel system for load carrying vehicles which is of such a nature whereby a vehicle will readily traverse rough ground and over logs and other similar obstacles.

Another object of this invention is to provide an improved vehicle which has a wheel assembly of such a nature whereby the entire vehicle may be readily tilted by an operator thereof so that it may climb over logs and other relatively high obstacles.

A further object of this invention is to provide an improved vehicle intended for use over rough terrain, the vehicle including a wheel and drive assembly which is so related whereby the entire vehicle is relatively balanced and may be tilted by an operator for control.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1:
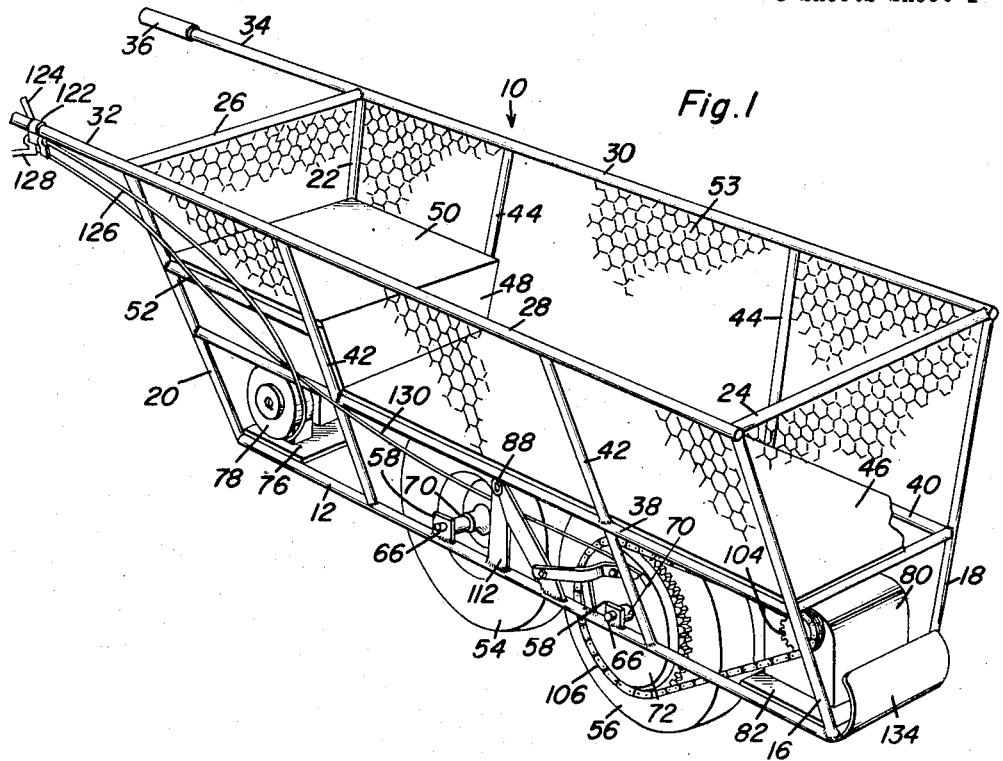
Figure 1 is a perspective view of the transporting machine which is the subject of this invention and shows the same as viewed from generally the front.
Figure 2:
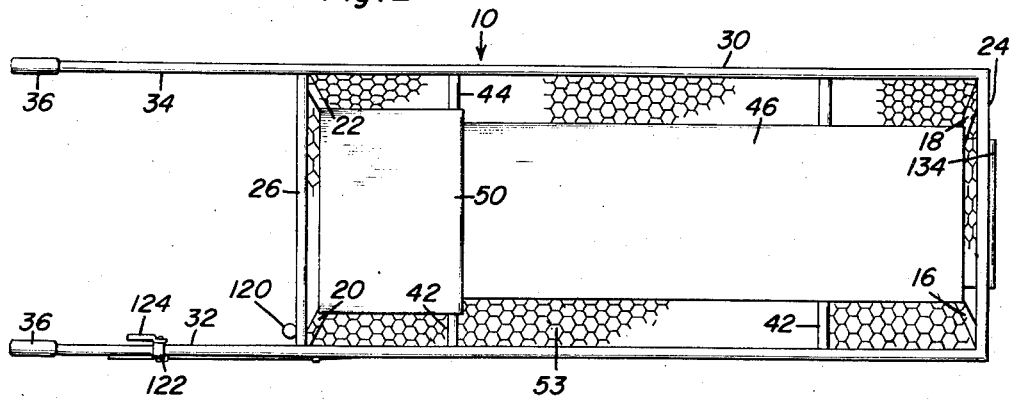
Figure 2 is a top plan view of the transporting machine of Figure 1 and shows the arrangement of the control handles thereof.

Figure 5 is an enlarged fragmentary side elevational view of the transporting machine and show the details of the wheel mounts and relationship of the drive assembly with respect to the wheel assembly; and Figure 6 is an enlarged fragmentary vertical sectional view taken substantially upon the plane indicated by the section line 6—6 of Figure 5 and shows the details of the mounting of one of the wheels.

Referring now to the drawings in detail, it will be seen that the transporting machine, which is the subject of this invention, includes a frame which is referred to in general by the reference numeral 10. The frame 10 includes a pair of narrowly spaced lower frame rails 12 and 14 which are disposed in the same general horizontal plane and which are in spaced parallel relation. Extending upwardly from the forward ends of the frame rails 12 and 14 in diverging relation are front frame members 16 and 18, respectively. Similar rear frame members 20 and 22 extend upwardly in diverging relation from the rear ends of the frame rails 12 and 14, respectively. The upper ends of the frame members 16 and 18 are connected together by an upper transverse frame member 24 whereas the upper ends of the frame members 20 and 22 are connected together by a transverse frame member 26.

The frame 10 also includes upper longitudinal frame rails 28 and 30 which correspond to the frame rails 12 and 14, respectively. The frame rails 28 and 30 are disposed in a horizontal plane spaced above the horizontal plane in which the frame rails 12 and 14 lie and are in parallel relation. The frame rails 28 and 30 are connected to the upper ends of the frame members 16 and 18, and 20 and 22 at their intersections with the transverse frame members 24 and 26, respectively. The frame rails 28 and 30 extend rearwardly of the transverse frame member 26 and form handles 32 and 34, respectively. Carried by the handles 32 and 34 at their rear ends thereof are suitable handgrips 36.

The frame 10 also includes intermediate frame rails 38 and 40 which extend between the frame members 16 and 20, and the frame members 18 and 22, respectively. Extending vertically between the frame rails 12 and 28 and having intermediate portions secured to the frame rail 38 are intermediate frame members 42. Similar intermediate frame members 44 extend between the frame rails 18 and 30 and have intermediate portions connected to the frame rail 40.

Overlying the frame rails 38 and 40 forwardly of the rearmost intermediate frame members 42 and 44 is a bottom plate 46. Extending upwardly from the rear edge of the bottom plate 46 is a vertical plate member 48 which terminates in a rearwardly directed seat 50. The seat 50 is supported by longitudinal frame members 52 extending between the frame members 20 and 42 and the frame members 22 and 44.

In order that various types of equipment and supplies may be carried by the frame 10, that portion of the frame 10 disposed above the bottom plate 46 and the seat 50 is provided with a wire mesh 52 to form an enclosure. Thus, materials and supplies may be rested upon the seat 50 and the bottom plate 46 and conveniently retained within the upper portion of the frame 10 which may be considered a luggage department.

Carried by the lower portion of frame 10 beneath the bottom plate 46 is a wheel assembly which includes wheels 54 and 56. The wheels 54 and 56 are disposed in tandem relation and are closely adjacent each other. Further, as is best illustrated in Figure 5, the wheels 54 and 56 are disposed in the central portion of the frame for a purpose which will be obvious hereinafter.

Inasmuch as the mounting of the two wheels is substantially identical, only the mounting of the wheel 56 will be set forth in detail. As is best illustrated in Figures 5 and 6, secured to the frame rails 12 and 14 and extending upwardly therefrom are plates 58 and 60, respectively. The plates 58 and 60 have aligned bores 62 and 64, respectively, in which is disposed a transversely disposed axle 66. The axle 66 is retained in place by cotter keys 68 or other suitable fasteners. Mounted on the axle 66 for rotation through the use of suitable bearings (not shown) is the wheel 56. In order that the wheel 56 may be centered with respect to the frame 10, there is carried by the axle 66 on opposite sides of the wheel 56, spacers 70.

Secured to one side of the wheel 56 adjacent the frame rail 12 is an enlarged drive sprocket 72, and a smaller drive sprocket 74 is secured to the opposite side of the wheel 56 adjacent the frame 14. The use of these drive sprockets 72 and 74 will be readily apparent hereinafter.

Referring now to Figures 1 and 5 in particular, it will be seen that extending transversely between the frame rails 12 and 14 immediately adjacent the frame members 20 and 22 is a mounting plate 76. Suitably secured to the mounting plate 76 is a power source in the form of an internal combustion engine 78.

In order to counterbalance the weight of the internal combustion engine 78, there is mounted in the forward portion of the frame 10 a speed selector in the form of a transmission 80. The transmission 80 is suitably mounted on a transversely disposed mounting plate 82 extending between and secured to the frame rails 12 and 14 at the forward ends thereof.

Figure 3:
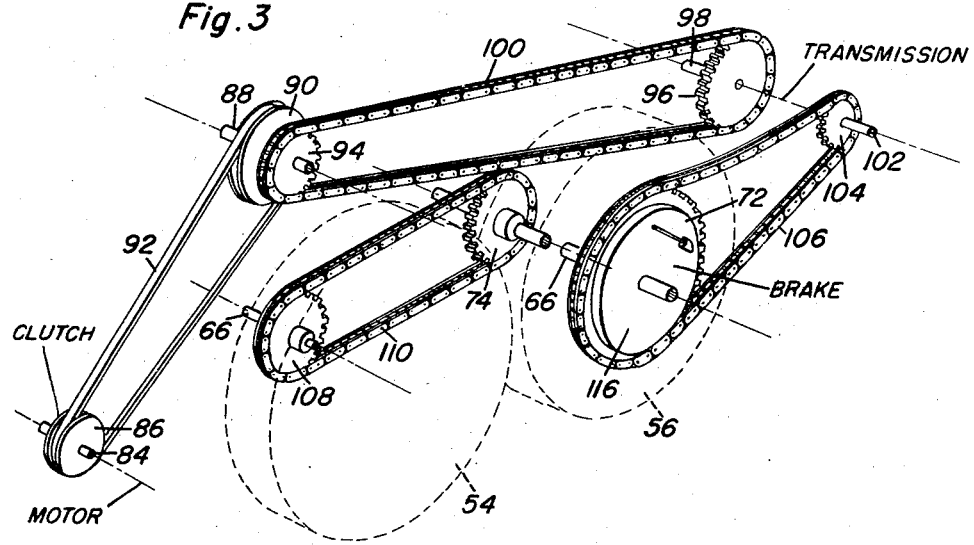
Figure 3 is a schematic perspective view of the drive train or drive assembly of the transporting machine.

Referring now to Figure 3 in particular, it will be seen that the internal combustion engine 78 includes a drive shaft 84 on which is mounted a drive pulley 86 having incorporated therein a clutch assembly. Disposed intermediate the wheels 54 and 56 is a jack shaft 88 on which there is mounted a drive pulley 90. Entrained over the pulleys 86 and 90 and connecting them together is a drive belt 92.

Secured to the pulley 90 for rotation therewith is a sprocket 94. The sprocket 94 is aligned with an input sprocket 96 mounted on an input shaft 98 of the transmission 80. Entrained over the sprockets 94 and 96 and drivingly connecting them together is a drive chain 100.

The transmission 80 also includes an outward shaft 102 on which is mounted a sprocket 104. The sprocket 104 is aligned with the sprocket 72 and is connected thereto by a drive chain 106.

In order that the wheel 54 may be driven in unison with the wheel 56, there is secured to the wheel 54 a sprocket 108 which is aligned with the sprocket 74. Entrained over the sprockets 74 and 108 and drivingly connecting the wheels 54 and 56 together is a drive chain 110.

Referring now to Figure 5 in particular, it will be seen that there is carried by the frame rail 12 an inverted V-shaped frame 112. The apex of the frame 112 is located substantially centrally of the wheels 54 and 56 and is aligned with an apex of a similar frame mounted on the frame rail 14. Extending between the apices of the frames 112 and rigidly secured thereto is a jack shaft housing carrying the jack shaft 88.

In order that down hill movement of the transporting machine may be controlled, there is carried by the frame 112 secured to the frame rail 12 mounting brackets 114 for a brake assembly 116. The brake assembly 116 is connected to the drive sprockets 104 and 72 for controlling the rotation thereof. Inasmuch as the brake assembly 116 may be of any conventional type, a further description thereof is believed to be unnecessary.

Connected to the transmission 80 and extending rearwardly therefrom is a shifting rod 118 which terminates in an upwardly directed control lever 120 at the rear of the frame 10 adjacent the handle 32. Also, carried by the handle 32 is a mounting bracket 122 which has connected thereto a control lever 124. The control lever 124 is connected to a Bowden wire control cable 126 which controls the operation of the throttle of the internal combustion engine 78. A similar control lever 128 is carried by the mounting bracket 122. The control lever 128 is connected to a Bowden wire type control cable 130 which is attached to the brake assembly 116 for controlling operation thereof.

Inasmuch as the wheels 54 and 56 are mounted in tandem relation closely adjacent each other and at the center of the transporting machine, it is readily apparent that by exerting pressure on the handles 32 and 34 the transporting machine may be tilted as desired. Thus, when the transporting machine meets an obstacle, such as the log 132 illustrated in Figure 4, the handles 32 and 34 may be moved downwardly so as to tilt the entire transporting machine up on the rear wheel 54 with the result that the forward wheel 56 climbs over the log 132. The engagement of the front wheel 56 with the log 132 greatly increases the climbing action of the machine and at the same time most of the traction load is placed on the wheel 54 which continues to push the machine forward as well as pushing the wheel 56 up over the log 132.

After the wheel 56 has climbed over the log 132, upward pressure may be exerted on the handles 32 and 34 to transfer a major portion of the weight of the transporting machine onto the front wheel 56. The rear wheel 54 may then easily climb over the log 132 and the transporting machine continue to travel.

From the foregoing, it is readily apparent that the particular tandem relation of the wheels 54 and 56 and the central positioning of such wheels in close proximity permits the transporting machine, which is the subject of this invention, to readily climb over relatively large obstacles.

Figure 4:
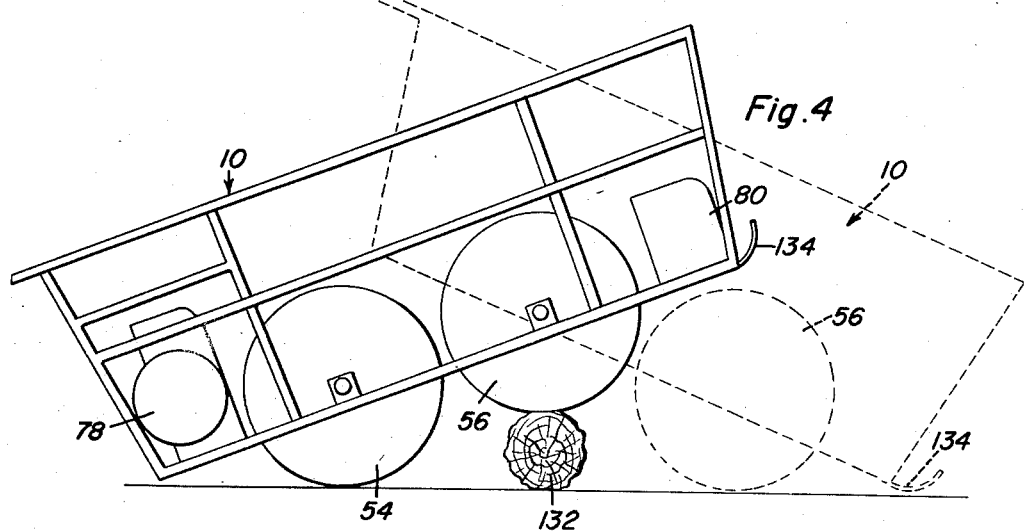
Figure 4 is a schematic side elevational view showing the transporting machine climbing over a log, the machine being shown in dotted lines in its descent over the log.

In order to prevent the forward portion of frame 10 from digging into the ground when the forward portion thereof is tilted downwardly and positioned such as that illustrated in dotted lines in Figure 4, there is provided on the forward portion of frame 10 a skid which is best illustrated in Figure 1, the skid being referred to by the reference numeral 134. The skid 134 is in the form of an arcuate plate which extends transversely of the frame 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A transportation device for use on trails in rough country comprising an elongated frame, an upper portion of said frame forming a luggage compartment, a wheel and drive assembly carried by a lower part of said frame below said luggage compartment, said wheel assembly including a pair of wheels disposed in fixed adjacent tandem relation, said drive assembly being connected to said wheels in driving relation, said drive assembly including a power source and a speed selector, means drivingly connecting said power source to said speed selector, said power source being disposed remote from said speed selector with said power source and said speed selector being disposed at opposite ends of said frame in counterbalancing relation.

2. A transportation device for use on trails in rough country comprising an elongated frame, an upper portion of said frame forming a luggage compartment, a wheel and drive assembly carried by a lower part of said frame below said luggage compartment, said wheel assembly including a pair of wheels disposed in fixed adjacent tandem relation, said drive assembly being connected to said wheels in driving relation, said tandem wheels being disposed immediately adjacent each other and in the central part of the length of said frame whereby one wheel will aid the other in passing over obstacles, said drive assembly including a power source and a speed selector, means drivingly connecting said power source to said speed selector, said power source being disposed remote from said speed selector with said power source and said speed selector being disposed at opposite ends of said frame in counterbalancing relation.

References Cited in the file of this patent

UNITED STATES PATENTS

| | | |
|---|---|---|
| 908,472 | Lyons | Jan. 5, 1909 |
| 991,485 | Darrow | May 9, 1911 |
| 1,255,128 | Bayley | Feb. 5, 1918 |
| 1,353,318 | Cowan | Sept. 21, 1920 |
| 1,817,028 | Brockway | Aug. 4, 1931 |
| 2,514,917 | Walstrom | July 11, 1950 |
| 2,567,423 | Cleghorn | Sept. 11, 1951 |
| 2,656,894 | Givannoni | Oct. 27, 1953 |